United States Patent [19]

Damico et al.

[11] 4,393,186

[45] Jul. 12, 1983

[54] THERMOPLASTIC POLYURETHANES PREPARED BY REACTING POLYISOCYANATE, POLYESTER POLYOL, CYCLOALIPHATIC DIOL AND A MONOFUNCTIONAL CHAIN-TERMINATING COMPOUND

[75] Inventors: Dennis J. Damico; Vincent J. Pascarella, both of Erie, Pa.

[73] Assignee: Lord Corporation, Erie, Pa.

[21] Appl. No.: 296,629

[22] Filed: Aug. 27, 1981

Related U.S. Application Data

[60] Continuation of Ser. No. 153,558, May 27, 1980, abandoned, which is a division of Ser. No. 50,070, Jun. 19, 1979, Pat. No. 4,250,274.

[51] Int. Cl.$^3$ ............................................. C08G 18/30
[52] U.S. Cl. ...................................................... 528/49
[58] Field of Search .......................................... 528/49

[56] References Cited

U.S. PATENT DOCUMENTS

| | | | |
|---|---|---|---|
| 2,871,218 | 1/1959 | Schollenberger | 528/80 |
| 3,357,954 | 12/1967 | Kirkaldy | 528/80 |
| 3,931,113 | 1/1976 | Seeger et al. | 528/80 |
| 4,049,590 | 9/1977 | Falkenstein et al. | 528/80 |
| 4,098,772 | 7/1978 | Bonk et al. | 528/49 |

Primary Examiner—Maurice J. Welsh
Attorney, Agent, or Firm—William E. Hedges

[57] ABSTRACT

Novel polyurethanes especially suited for applications requiring initial heat resistance in a non-alcohol, non-exotic solvent system such as methyl ethyl ketone and having peel strengths of at least 5 pounds per linear inch (pli) uncrosslinked at about 180° to about 200° F., optionally containing crosslinkers, and which are typically used in the automobile industry, are described. The new polyurethanes are substantially free of reactive isocyanate and hydroxyl groups and comprise the reaction product of (a) at least one polyisocyanate having at least two reactive isocyanate groups;

(b) at least one polyester polyol having at least two hydroxyl groups;

(c) at least one cycloaliphatic diol chain-extending agent; and (d) at least one monofunctional isocyanate-reactive chain-terminating compound;

said polyisocyanate being present in an excess amount with respect to said polyester polyol and said cycloaliphatic diol;

said monofunctional isocyanate-reactive compund being present in an amount sufficient to ensure reaction of excess isocyanate groups;

said polyester polyol comprising the reaction product of (i) at least one saturated acyclic, cyclic or aromatic monomeric or polymeric polyol having at least two hydroxy groups;

(ii) from 30 to 100 mole percent terephthalic acid; and (iii) from 70 to 0 mole percent of at least one saturated or unsaturated acyclic, cyclic or aromatic carboxylic acid, other than terephthalic acid, having at least two carboxyl groups;

said polyurethane having a molecular weight of at least 20,000.

10 Claims, No Drawings

THERMOPLASTIC POLYURETHANES PREPARED BY REACTING POLYISOCYANATE, POLYESTER POLYOL, CYCLOALIPHATIC DIOL AND A MONOFUNCTIONAL CHAIN-TERMINATING COMPOUND

This application is a continuation of Ser. No. 153,558, filed May 27, 1980, and now abandoned which was a divisional of Ser. No. 050,070 filed June 19, 1979, now U.S. Pat. No. 4,250,274 issued Feb. 10, 1981.

BACKGROUND OF THE INVENTION

The present invention relates to novel thermoplastic nonfunctional polyurethanes and to novel adhesive compositions containing these polyurethanes together with heat-reactive resol phenolic resins and vinyl solution polymers. The adhesives are useful for laminating plastic and particularly vinyl films to metal at lower activating temperatures than previously available adhesives.

Vinyl/urethane/phenolic adhesive compositions have been commercially available for some time and are known to be useful for laminating vinyl films to metal and to be operable at somewhat lower activation temperatures than other adhesives suitable for this purpose. However, even these relatively low temperature activating adhesives have been found unsatisfactory for the recently introduced thin film vinyl laminates. These new laminates differ from the standard 10 mil or thicker products in that they employ six mil or thinner vinyl films. Such thin films are substantially lower in cost per unit of area than the thicker vinyl films previously in use but cannot tolerate the 375° to 425° F. and higher peak metal laminating temperatures typically employed without losing their embossing, or distortion of the wood grain or other decorative pattern. Consequently laminating temperatures of no more than about 300° F. may be used with such thin vinyl films.

THE PRIOR ART

The general procedure of the prior art for bonding vinyl films to metal and certain adhesives for this purpose are described in Goldberg et al U.S. Pat. No. 3,108,986 issued Oct. 29, 1963. The adhesives are derived from (1) a copolymer of methyl methacrylate and a beta-unsaturated carboxylic acid, the copolymer having been prepared by addition polymerization techniques, (2) a blocked polyisocyanate cross-linking agent, and (3) an inert mineral filler. Such adhesives are used for bonding decoratively embossed or printed vinyl films to steel, aluminum or magnesium items such as luggage, business machine cabinets, television set cabinets, interior automotive surfaces and a wide variety of other applications. In preparing the vinyl to metal laminates, the metal sheet or body is usually coated with a lacquer adhesive to yield a dry film of about 0.1 to 1.0 mil. The coated metal is then passed through an oven in which the solvent component of the adhesive is removed by volatilization at a temperature of about 200° F. In a second zone of the oven, the adhesive-coated metal is heated to a temperature of about 375° to 425° F. to render the adhesive residue tacky or fluid enough to wet a vinyl film. The vinyl film is then applied by passing the metal and vinyl sheets in contact through a cold nip roller. The laminate is then quenched by a cold water spray to permit retention of any embossed pattern present on the vinyl film. An adhesive to be acceptable in such a process must bond the vinyl to the metal firmly enough so that the vinyl film tears before there is separation of the laminate on attempted delamination of the film from the metal substrate. Moreover, the adhesive bond must withstand a deep drawing operation when the laminate is placed in a mold and deformed to conform to the cavity in the mold by means of a mandrel forced into the mold under high pressure.

Carpenter et al U.S. Pat. No. 3,658,939 issued Apr. 25, 1972 describes organic solvent soluble linear polyurethanes useful as laminating adhesives which are formed by the reaction and condensation of a linear hydroxyl-terminated polyester polyol having a molecular weight between about 1800 and 6000 and an acid value between 0 and 4, an organic polyisocyanate, and a chain extender including a short chain linear aliphatic diol of a specified structure. The preferred chain extender is dimethylol propionic acid. It is further preferred that at least a portion of the dicarboxylic acid and diol components contain an alicyclic ring.

Davis et al U.S. Pat. No. 3,981,762 issued Sept. 21, 1976 describes adhesives for bonding vinyl to metal which are derived from a urethane prepolymer; a vinyl chloride, vinyl acetate, maleic anhydride terpolymer; a phenolic resin; and chlorinated rubber.

Stone et al U.S. Pat. No. 3,982,986 issued Sept. 28, 1976 describes the lamination of saran films to treated polyethylene films by means of thermoplastic polyether polyurethanes applied to the substrates in aqueous solutions.

Other pertinent prior art patents include McClung et al U.S. Pat. No. 3,759,778 issued Sept. 18, 1973; Bierman et al U.S. Pat. No. 3,879,238 issued Apr. 22, 1975; and Thurn U.S. Pat. No. 3,969,301 issued July 13, 1976.

In view of the foregoing it is apparent that a variety of different adhesive systems are available for bonding plastic films, and particularly vinyl films to metal. However, a need remains in the art for adhesives capable of forming acceptable bonds between vinyl films and metal at adhesive activation temperatures below about 300° F. which will not adversely affect the embossing or printed pattern on the vinyl film, particularly when the films are 6 mils or less in thickness.

It is a primary object of the present invention, therefore, to provide adhesives for the bonding of vinyl films to metal which are activateable at temperatures of 300° F. or less to provide vinyl to metal bonds in which the vinyl film will tear before delamination and which have good environmental resistance.

It is another object of the invention to provide novel nonfunctional thermoplastic polyurethanes useful in the new adhesives.

It is still another object of the invention to provide single package laminating adhesives of improved heat resistance.

SUMMARY OF THE INVENTION

The foregoing and other objects of the invention which will become apparent below, are attained by providing new adhesives containing a heat reactive phenolic resol resin having a methylol content of at least 15 percent preferably at least 30 percent, by weight; certain nonfunctional thermoplastic polyurethanes having a molecular weight of at least 20,000, preferably from 60,000 to 300,000; and a vinyl solution polymer. It has been found that the optimum ratio of the phenolic/urethane/vinyl resin components on a percent by weight basis is about 22/35/43, respectively. However, the components may be combined in proportions in the range of 15 to 30 weight percent phenolic resin; 25 to 45 weight percent urethane; and 35 to 55 weight percent vinyl resin, based on the dry weights of the resins in the total composition. Adhesives made in this way differ from those of the prior art in having activation temperatures of 300° F. or less, even as low as 260° F., which makes them suitable for laminating the new thin vinyl films of 6 mils or less thickness without loss of embossing or distortion of any wood grain or other printed decoration on the film.

The low temperature activation properties of the new adhesives are attributable to three factors. The first of these is the use of heat reactive phenolic resols having a substantial methylol content. Indeed the methylol content of the resol should be maximized, about 50% by weight being about the highest methylol content obtainable, which corresponds to trimethylol phenol. However, as noted above, as little as 15% methylol is useful, although at least 30% by weight is preferred in order to maximize the desired effect of lowering the activation temperature of the adhesives.

The other factors which lower the activation temperature of the adhesive are the incorporation of an aromatic dicarboxylic acid and especially terephthalic acid in the urethane and the use of analicyclic diol and preferably dimethylolcyclohexane as a chain-extending agent of the urethane. These two factors may be used alone with useful effect, but are more effective when used together, and still more effective when used in combination with the first factor mentioned above.

More specifically, the polyesterurethanes are obtained by the reaction of any known monomeric polyisocyanate with polycaprolactone polyols or certain polyester polyols; the toluene diisocyanate being preferred. The polyester polyols are obtained by the condensation of polyhydroxy compounds with polycarboxylic acids or the anhydrides thereof. Whenever a polycarboxylic acid is recited herein it should be understood that the corresponding anhydride could also be employed, if it exists. As noted above, unless the polyurethane is chain-extended with dimethylolcyclohexane, the polycarboxylic acid component employed in making the polyester polyol must contain at least 30 mol % of aromatic polycarboxylic acid. The preferred polyester polyols, even when dimethylolcyclohexane is the chain extender, are obtained by reacting together (a) at least one diol, either a dihydroxy monomer or a dihydroxypolyester, and (b) a polycarboxylic acid component containing about 30 to 100 mol % of at least one aromatic polycarboxylic acid or the anhydride thereof, and about 70 to 0 mol % of at least one saturated or unsaturated aliphatic or cycloaliphatic polycarboxylic acid or the anhydride thereof. The preferred automatic polycarboxylic acid is terephthalic acid. When the polyester polyol contains at least about 30% aromatic dicarboxylic acid and preferably terephthalic acid, any low molecular weight diol chain-extender may be employed. The polyester polyol may also be polycaprolactone as noted above. The polyisocyanate component should be present in slight excess of the polyester polyol in the preparation of the polyesterurethane, i.e. the isocyanate/hydroxyl ratio should be at least 1.01:1, and preferably 1.10 to 5:1, a range of 1.15 to 1.8:1 being especially preferred.

The final component of the adhesives may be any suitable vinyl solution polymer. A suitable polymer is described in Davis et al U.S. Pat. No. 3,981,726 issued Sept. 21, 1976, as a terpolymer of vinyl chloride, vinyl acetate and maleic anhydride typically in the ratio by weight of 86:13:1, commonly known as VMCH. Such vinyl terpolymers for use in the present invention should contain at least about 1% maleic anhydride and preferably about 2%, as much as 10% being acceptable.

The new adhesives prepared substantially as above may be packaged in a single container since they are relatively heat and storage stable at ambient temperatures. The adhesives are activateable at temperatures of 300° F. (150° C.) and even less down to about 250°-260° F. (about 125° C.) and thus are suitable for laminating vinyl films of 6 mils or less thickness which would be distorted by the 375° to 425° F. (190° to 220° C.) temperatures normally employed to laminate 10 mil or thicker vinyl films to metal.

DETAILED DESCRIPTION OF THE INVENTION

The Polyester Polyols

The polyester polyols will be described in detail first since they largely determine the character of the novel thermoplastic polyurethanes employed in the low temperature-activateable adhesives of the present invention. The polyester polyols useful in preparing the thermoplastic urethanes can be obtained by the condensation of polyhydroxy compounds with polycarboxylic acids or the anhydrides thereof according to procedures well known in the art. As noted above, unless the polyurethane is derived from polycaprolactone and chain-extended with dimethylolcyclohexane, the polycarboxylic acid or anhydride moiety of the polyester polyol must contain at least about 30 mol % of an aromatic polycarboxylic acid or anhydride based on the total mols of polycarboxylic acid, preferably terephthalic acid.

Generally speaking, the polyester polyols are hydroxyl terminated polyesters having a molecular weight in the range from about 300 to about 6000 and preferably about 1500 to 3000. More specifically, the preferred polyester polyols are obtained by the reaction of: (a) at least one compound having at least two reactive hydroxyl groups; including dihydroxy monomers and dihydroxypolyesters and (b) a stoichiometric amount of a polycarboxylic acid component which is made up from about 30 to 100 mol % of at least one aromatic polycarboxylic acid or the anhydride thereof; and from about 70 to 0 mol % of at least one saturated or unsaturated aliphatic or cycloaliphatic polycarboxylic acid or the anhydride thereof. The polyester polyols obtained in this way have a polycarboxylic acid moiety containing at least about 30 mol % of an aromatic polycarboxylic acid, or anhydride, preferably terephthalic acid, and, therefore, when converted to the polyurethane, can be chain-extended with any low molecular weight diol, the 2- to 8-carbon atom diols and especially the cycloaliphatic diols being preferred and most especially dimethylolcyclohexane.

Virtually any compound containing two or more reactive hydroxyl groups commonly employed in making known polyester polyols may be used in the present invention.

Relatively low-molecular weight diols useful in forming the polyester polyols of the invention include acyclic, alicyclic and aromatic dihydroxy compounds of which the preferred diols have 2 to about 15 carbon atoms; and 2- to 8-carbon atom diols being especially preferred. Such diols include, without limitation: ethylene glycol; 1,2- and 1,3-propylene glycols; 1,2-, 1,3-, 1,4-, and 2,3-butylene glycols; pentamethylene glycols; neopentyl glycol; 2,2-dimethyl-trimethylene glycol; 1,6-hexane diol; 1,6-heptane diol; 1,7-heptane diol; 1,8-octane diol; decamethylene glycols; diethylene glycol; tripropylene glycol; dibutylene glycol; dihydroxy cyclohexane; dimethylolcyclohexane; 1,20-eicosanyl diol; resorcinol; hydroquinone; 1,5-dihydroxy napthalene; and the like.

Bisphenols such as bis (p-hydroxy) diphenyl; bis (p-hydroxyphenyl) methane; and bis (p-hydroxyphenyl) propane; are also useful.

Longer chain diols including polymeric glycols having terminal or as nearly terminal as possible hydroxy groups and molecular weights from about 400 to 6000 are also useful. The long chain glycols used to prepare the polyester polyols of the invention include poly (alkylene oxide) glycols having a carbon-to-oxygen ratio of about 2.0–4.3:1. Suitable materials of this type include poly(ethylene oxide) glycol; poly (1,2 and 1,3-propylene oxide) glycol; poly (tetramethylene oxide) glycol, and random or block copolymers of ethylene oxide and 1,2-propylene oxide and random or block copolymers of tetrahydrofuran with minor amounts of a second monomer such as 3-methyltetrahydrofuran so that the carbon-to-oxygen ratio in the glycol does not exceed about 4.3:1.

Difunctional polyesters obtained by the polymerization of lactones such as caprolactone, or the polycondensation of hydroxycarboxylic acids may also be used as the polyester polyol component of the thermoplastic urethanes.

When the polyester diol is a blend of polyesters one being based on the aromatic dicarboxylic acid, any of the above glycols may be used in place of all or part of any aliphatic polyester diol in the blend. Also the aliphatic polyester may be a polycaprolactone in the case of blends or in the case of a single polyester a lower molecular weight polycaprolactone may be chain extended by aromatic dicarboxylic acids to provide the necessary level of aromaticity.

The polyol component of the polyester polyols may also contain small proportions of polyhydric alcohols such as glycerol; trimethylol propane; 1,2,6-hexanetriol; pentaerythritol; sorbitol; mannitol; and the like.

The Polycarboxylic Acids

The polyester polyols are obtained by reacting the foregoing polyols with a polycarboxylic acid component. As noted above when any polycarboxylic acid is referred to herein it is to be understood that the anhydride of the acid is also intended if it exists. The useful polycarboxylic acids include acyclic, alicyclic and aromatic acids containing two or more carboxylic acid groups or the anhydrides thereof. As noted above, the polycarboxylic acid component of the polyester polyols must contain at least 30 mol % of at least one aromatic carboxylic acid or the anhydride thereof. Suitable aromatic acids include, without limitation: phthalic acid, isophthalic acid, terephthalic acid, tetrahydrophthalic acid, and the dimethyl derivitives thereof and the existing anhydrides of such acids. Bi-benzoic acid and phenylene dicarboxylic acid are also useful. The preferred aromatic dicarboxylic acids contain 8 to 16 carbon atoms; terephthalic acid and its anhydride being especially preferred.

Suitable acyclic and alicyclic aliphatic polycarboxylic acids include, without limitation: aconitic acid; adipic acid; allylmalonic acid; azeleic acid; 4,4-bicyclohexyl dicarboxylic acid; 4-cyclohexane-1,2-dicarboxylic acid; citraconic acid; cyclopentane dicarboxylic acid; 1,3- and 1,4-cyclohexane dicarboxylic acids; decahydro-1,5- and 2,6-naphthalene dicarboxylic acids; diethylmalonic acid; fumaric acid; glutaric acid; itaconic acid; muconic acid; maleic acid; malonic acid; 4,4'-methylene-bis(cyclohexane carboxylic acid; methyl acipic acid; oxalic acid; pimelic acid; sebacic acid; suberic acid; 2-ethyl suberic acid; succinic acid; and 2,2,3,3-tetramethyl succinic acid. The preferred aliphatic polycarboxylic acids are adipic acid and the cyclohexane dicarboxylic acids.

Any of the known methods for synthesizing polyesters may be used to prepare the polyesters useful in the practice of the invention. Typical methods of synthesis are shown in U.S. Pat. Nos. 3,201,372; 3,523,101; 3,245,956; and the like. In the case of the polycaprolactone polyesters typical synthetic methods are shown in U.S. Pat. Nos. 2,914,556; 2,933,477; 3,169,945; 3,186,971; 3,190,858; 3,224,982; 3,240,730; 3,523,101 and the like.

The Polyurethanes

The novel polyurethanes useful in the adhesives of the present invention are thermoplastic polyesterurethanes and are referred to herein as non-functional since they are substantially devoid of reactive isocyanate and hydroxyl moieties. These polyesterurethanes have a number average molecular weight of at least about 20,000 and preferably from about 60,000 to about 300,000. It has been found that several factors contribute to the high heat resistance and low activation temperatures of adhesives containing these polyesterurethanes. One of these factors is the use of a cyclcaliphatic diol, preferably dimethylolcyclohexane, as a chain extending agent for the polyesterurethane, thus characterizing one group of useful polyesterurethanes which are referred to below as type A. A second factor contributing to the desired properties is the incorporation of an aromatic polycarboxylic acid or anhydride and preferably terephthalic acid in the polyester polyol which characterizes group B of the polyesterurethanes. Group C polyesterurethanes combine the characteristics of groups A and B and thus are polyesterurethanes containing an aromatic polycarboxylic acid or the anhydride thereof, again preferably terephthalic acid, and which are also chain extended with a cycloaliphatic diol, again preferably dimethylolcyclohexane.

These polyesterpolyurethanes may be prepared by any known method from monomeric polyisocyanates, polyester polyols including polycaprolactone, and chain-extending agent precursor materials. It is presently preferred, however, to prepare the polyesterurethanes by polymerization in solution in a suitable organic solvent, of at least one hydroxyfunctional polyester, a cycloaliphatic diol preferably dimethylolcyclohexane, and at least one monomeric polyisocyanate, preferably a diisocyanate, at an isocyanate-hydroxyl ratio of at least 1.01:1 and preferably at a ratio in the range from about 1.10 to 5:1, and especially in the range from 1.15 to 1.8:1. The reaction is continued in the solvent to an endpoint corresponding to at least about 95% depletion of the polyester hydroxyl moieties to form an isocyanate-functional polyurethane prepolymer or intermediate. This prepolymer is further reacted in the solvent with not more than the stoichiometric amount, based on the free isocyanate content of the prepolymer, of a cycloaliphatic diol chain extender, preferably dimethylolcyclohexane, to a solution viscosity corresponding to the desired molecular weight. The reaction is then terminated by adding at least the stoichiometric amount, based on the free isocyanate content of the prepolymer, of at least one monofunctional isocyanate-reactive chain-terminating compound such as methyl ethyl ketone oxime, for example. The resulting nonfunctional thermoplastic polyurethane can be diluted to any desired total solids content.

Virtually any known monomeric polyisocyanate may be employed; the diisocyanates being preferred and the toluene diisocyanates being especially preferred. Suitable polyisocyanates include, without limitation, 2,4-toluene diisocyanate and 2,6-toluene diisocyanate and the mixture of these two diisocyanates commonly known as TDI; 1,6-hexamethylene diisocyanate; diphenylmethane-4,4'-diisocyanate (MDI); dicyclohexylmethane-4,4'-diisocyanate and isophorone diisocyanate, and the like. Mixtures of two or more diisocyanates may also be employed. Monomeric polyisocyanates containing more than two isocyanate groups can also be employed, such as polymethylene polyphenyl polyisocyanate ("PAPI"), for example.

The polymerization reaction is terminated and any remaining reactive isocyanate groups are scavenged by the addition of at least the stoichiometric amount, based on the free isocyanate content of the prepolymer, of at least one monofunctional isocyanate-reactive chain-terminating compound. Substantially any of the known chain terminating reagents can be employed for this purpose. With respect to such compounds, it is deemed sufficient to state that they are monofunctional with respect to isocyanate activity. Suitable chain terminators include aliphatic and aromatic alcohols such as methanol, isopropanel, isobutanol, cyclopentanol, and phenol; primary and secondary amines such as isopropylamine, diphenylamine and 2,2'-dinitrophenylamine; and compounds containing enolizable hydrogen such as acetoacetic ester, diethyl malonate, acetonyl acetone, methyl ethyl ketone oxime and methyl isobutyl ketone oxime. The amount of chain terminating reagent which is added after the isocyanate-terminated polyurethane intermediate has been chain extended to the desired molecular weight is not critical. It should be at least sufficient to consume all the unreacted isocyanate functionality and is preferably in slight excess, e.g., a 5 percent excess, to ensure effective termination of the reaction at the desired viscosity, i.e., molecular weight, end point. Generally, the chain terminating reagent is added when the solution viscosity at 70° C. is in the range of about 4,000 to about 40,000 centipoises.

The chain-extending agents useful in bringing the polyurethanes to the desired molecular weight of at least about 20,000 and preferably about 60,000 to about 300,000 and to corresponding viscosities in the range from about 5,000 to about 40,000, preferably about 20,000, mPa's at 30% non-volatile solids are low molecular weight diols, preferably cycloaliphatic diols. As noted above, dimethylolcyclohexane is an especially preferred chain-extender and can be used even when the urethane contains no aromatic polycarboxylic acid, i.e. with polycaprolactone-containing urethanes. When the polycarboxylic acid component of the polyester polyol of the urethane contains at least 30 mol % of an aromatic carboxylic acid, other diols may be used such as 2 to 15-carbon atom and preferably 2–8-carbon atom, straight and branched chain glycols such as ethylene glycol, propylene glycol, 1,3-butylene glycol, neopentyl glycol, diethylene glycol, 1,4-butane diol, 1,6-hexane diol, 1,8-octane diol, 2-methyl-2,4-pentane diol, ethylene diamine, hexamethylene diamine, p,p'-diaminodiphenylmethane, hydroxyethylamine and hydroxybutylamine. The cycloaliphatic diols having from 4 to 10 or more carbon atoms are especially preferred, for example, the cyclobutane, cyclopentane, cyclohexane, cyclooctane and cyclodecane diols and the unsaturated derivatives thereof. The use of the cyclic diol chain-extenders afford a more rigid polyurethane and enchances temperature resistance of the adhesives. The amount of difunctional chain extender is less than a stoichiometric amount, based on the free isocyanate content of the isocyanate-terminated polyurethane intermediate, and will generally be in the range from 0.85 to 0.98 of the theoretical stoichiometric quality.

The preferred nonfunctional thermoplastic polyesterurethanes are derived from hexanediol adipate polyester polyols modified with an aromatic acid, preferably terephthalic acid, and the urethane prepolymer chain-extended with a dimethylolcyclohexane.

The Adhesives

As noted above, the low temperature activateable adhesives of the invention comprise in combination, a heat reactive phenolic resol resin/a urethane resin/a vinyl solution polymer; the optimum proportions being about 22/35/43 percent by weight, respectively, based on the total weight of the dry resins in the total composition. However, the proportions may vary from 15 to 30 weight percent phenolic resin, 25 to 45 weight percent polyurethane and 35 to 55 weight percent vinyl resin, also on a dry weight basis. The compositions are formulated by blending the three types of resins in solution in a suitable organic solvent at the desired viscosity which may range from 10 mPa's to 1000 mPa's, and preferably 15 to 20 percent by weight. Suitable solvents include esters such as ethyl acetate, isobutyl acetate and butyl acetate; ketone such as acetone, methyl ethyl ketone (MEK), methyl isobutyl ketone (MIBK), methyl butyl ketone, cyclopentanone and cyclohexanone; ethers, including cyclic ethers such as 1,4-dioxane and tetrahydrofuran (THF); amines such as N,N-dimethyl acetamide, dimethylformamide (DMF), tetramethyl urea and N-methylpyrrolidone; hydrocarbons such as n-hexane, toluene and xylene; and including compatible mixtures of two or more of any of the solvents. Minor amounts of secondary solvents, including glycol ethers such as ethylene glycol monomethyl ether, ethylene glycol monobutyl ether and ethylene glycol monophenyl ether can often be advantageously incorporated into the solvent systems. The adhesives are shelf stable for extended periods of time, and are activateable at temperatures of 150° C. (300° F.) or less down to 120° C. (250° F.). The adhesive bond provided by these adhesives have excellent heat resistance. The urethane components of the adhesives have been described below.

The Phenolic Resol Resins

The reactive phenolic resol resins employed in the adhesive of the present invention, in order to provide enhancement of the low temperature activation properties of the adhesives, must have a methylol content of at least about 15% by weight. Indeed, the methylol content should be maximized and is preferably at least about 30% by weight. Most preferably, the resol should have the maximum methylol content of about 60% by weight which corresponds to trimethylol phenol. Phenolic resins of the type useful in the adhesives and their preparation are discussed in detail in Hable et al U.S. Pat. No. 3,242,230 issued Mar. 22, 1966 at col. 10 lines 25-72 and col. 12, lines 4-44. The phenolic resol resins used in the adhesives of the present invention are well known materials made by the condensation of monomeric phenols and an aldehyde in an alkaline medium at an aldehyde; phenol ratio of at least 0.75:1, preferably at least 0.95:1, and, generally, 2.5-3:1. Phenol and formaldehyde are the preferred reactants, although other aldehydes and phenolic materials, such as furfural and o-cresol, can be employed. The phenolic resol resins are characterized by the presence of one or more methylol (hydroxymethyl) groups. The methylol groups, activated by the phenolic hydroxy groups, are extremely reactive and are responsible for the condensation reaction leading to the resinification of the phenol alcohols, e.g., o-hydroxybenzyl alcohol, which are formed as initial reaction products.

The resinification of phenols with aldehydes proceeds in three stages: resols or A stage resins, resitols or B stage resins and resites or C stage resins. The resols or A stage resins useful herein are low molecular weight resins soluble in water, alkali, alcohols and ketones, the latter being the preferred solvents in this invention. Some methylol groups derived from the aldehyde undergo condensation with ortho and para hydrogen atoms in adjacent molecules to yield methylol phenols linked by means of methylene bridges. While substituted phenols may be used they are not preferred since the substituents clearly reduce the possibility for the formation of methylol groups which are to be maximized.

Substantially any phenolic resol resin having a methylol content of at least 15 percent by weight can be employed in the practice of this invention. It has been found that phenolic resol resins which have methylol contents of at least 15, preferably 30 to 50, percent by weight, when used in accordance with the invention, provide the adhesive compositions with, (1) lower activation temperatures than previously available adhesives as well as, (2), improved heat stability after curing. These improved properties are obtained by the use of the herein-described phenolic resol resins alone but even greater improvements in decreased activation temperatures and heat stability are obtained when the methylol-containing phenolic resol resins are used in conjunction with polyurethanes containing an aromatic polycarboxylic acid, especially terephthalic acid.

The Vinyl Resins

The third essential component of the new adhesives is a vinyl solution polymer and more particularly a vinyl chloride/vinyl acetate/maleic anhydride terpolymer in which the components are present in ratios of about 86/13/1 to 10, i.e. the resins contain at least about 1%, preferably 2%, and permissably up to about 10% maleic anhydride on a dry weight basis in the total composition. These components may be dissolved in volatile organic solvents, suitably a mixture of toluol, methyl ethyl ketone and methyl isobutyl ketone.

Having now described the various ingredients of the adhesives, specific preferred adhesives will be described below.

EXAMPLE I

The general procedure for preparing the polyurethane lacquers involves dehydrating the macroglycol in solution in an organic solvent such as methyl ethyl ketone (MEK) by azeotropic distillation at 80° to 90° C. The amount of MEK solvent is calculated to run the extension at 50% total solids content. The monomeric polyisocyanate is then added at 50° C. with dibutyltin dilaurate (0.01% based on total solids content) catalyst. The resulting exotherm is controlled at 70° to 80° C. The prepolymer is then maintained at a temperature of about 70° to 80° C. until an endpoint is reached determined by depletion of the hydroxyl moieties in an amount equivalent to 98 to 105%. The prepolymer is then cooled at 40°-50° C. and the dimethylcyclohexane chain-extending agent is added. The reaction is continued at about 70° C. until a viscosity of about 8000 to 15,000 cps at 70° C. is obtained. The reaction is then terminated and all free isocyanate reacted by the addition of methyl ethyl ketone oxime (0.4% by weight). The polyurethane lacquer is then diluted with MEK to a total solids content of about 30% by weight.

The foregoing general procedure was followed in the preparation of a terephthalate-modified hexanediol adipate polyester urethane prepolymer chain-extended with 1,4-dimethylolcyclohexane. The macroglycol was a 50/50 mixture of poly(hexamethylene) adipate/terephthalate having a molecular weight of 1284. The monomeric isocyanate was a mixture of the 2,4-and 2,6-toluene diisocyanates commonly called TDI. The molar ratio of macroglycol/TDI/dimethylolcyclohexane in the urethane was 1/3/2. The prepolymer obtained by reaction of these materials was chain-extended with 1,4-dimethylolcyclohexane. The reaction was run in methyl ethyl ketone (MEK) as the solvent and the finished lacquer contained 16% MEK by weight, the remainder being the polyesterurethane.

An adhesive was formulated by blending 12 parts by weight of a 50% solution in "Cellosolve" of a phenolic resol having a methylol content of 36% by weight; 60 parts by weight of the polyesterurethane described above in a solution containing 16% MEK by weight; and 12 parts by weight of a 20% by weight solution in MEK of VMCH, a terpolymer of vinyl chloride/vinyl acetate/maleic anhydride in proportions of 86/13/1, and 18 parts by weight of additional MEK solvent for a total of 150 parts by weight. The dry solids content of the solution was 6 parts phenolic resol, 9.6 parts polyurethane resin and 12 parts vinyl resin for a total of 27.6 parts dry solids, the remaining solvent being 6 parts Cellosolve and 116.4 parts MEK based on the 150 parts of the total composition. The phenolic resol/urethane/vinyl resin ratio of a dry solids weight basis was 1.0/1.6/2.0 and on a dry solids percent by weight basis was 21.7/34.8/43.5. The adhesive diluted with MEK and packaged for storage had a solids content of 18.4%, a viscosity of 40 mPa's, a density of 7.15 lbs/gal. and a flashpoint of −6° C.

EXAMPLE II

A second adhesive composition was prepared according to Example I except that 12 parts by weight of a 50% solution of trimethylol phenol in Cellosolve was substituted for the phenolic resol resin containing 36 weight percent methylol by weight of the 6 parts by weight of dry solids in the solution. This adhesive was also packaged and had the same solids content, viscosity, density and flashpoint as the adhesive of Example I.

EXAMPLE III

A third adhesive was made according to the general procedure of Examples I and II employing a different macroglycol, in this case, a polyesterurethane obtained by reacting a poly(ethylene adipate) having a molecular weight of 858 with TDI and 1,4-dimethylolcyclohexane in molar proportions of 1/4.1/3. The adhesive was formulated as in Example I and II.

TESTING

The adhesive of Examples I and II were used to bond 6 mil vinyl film having wood grain decoration to "Bondrite" 1303 phosphate coated steel panels. The adhesives were applied to the panels using a number 10 wire wound draw down bar and the panels were dried at room temperature for about 30 minutes. The coated panels were then placed on a heated platen and heated to about 300° F. (149° C.); some for 30 seconds, some for 1 minute, and some for 2 minutes. On removal from the heated platen, the panels were immediately nipped to the vinyl film using pressure rollers at room temperature. The resulting laminates were tested immediately by standard flat and dimple tests and by the same flat and dimple tests after boiling water treatment. The panels were rated either pass or fall as to the strength of the bond against delamination. The 0.5 minute baked panels passed the initial flat test for both adhesives, but failed the dimple test. After boiling water treatment, the panels still passed the flat test for both adhesives but again failed the dimple test. The one-minute based panels produced the same results except that the adhesive of Example I also passed the dimple test after boiling water treatment. The two-minute baked panels passed all tests for both adhesives, thus exhibiting excellent bonding at 300° F. (149° C.) which is 75° to 125° F. below the 375° to 425° F. activation temperatures required by the adhesives of the prior art.

The adhesive of Example I was also tested in comparison to a commercially available adhesive using the same vinyl films on "Bondrite" 1303 steel panels; the panels having been laminated on a laboratory model coater laminator at a bake temperature of 300° F. The commercial adhesive provided no bonds at all whereas the adhesive of Example I gave stock breaks of the vinyl film.

In order to illustrate the advantage of employing a phenolic resol resin having a high methylol content two samples of adhesives were made by the foregoing general procedure based upon a polycaprolactone/-butanediol adipate polyester urethane. One sample of adhesive contained I-resin, a phenolic resol containing only about 8% methylol by weight. The other adhesive was made using trimethylol phenol which contains about 50% methylol by weight. Vinyl to steel laminates were made as above and baked at 300° F. for 0.5 minute, 1 minute and 2 minutes. All of the bonds obtained with the adhesive made with a resol of only 8% methylol content were rated poor. The 0.5 minute-baked samples with the other adhesive containing a resol having a methylol content of 50% were also poorly bonded but the 1 minute- and 2 minute-baked panels made with this adhesive were rated as having good bonds. Inasmuch as these adhesives did not contain any aromatic polycarboxylic acid, the improved adhesion was entirely due to the increased methylol content of the second adhesive.

More specifically, the adhesive of Example I containing a terephthalate modified urethane chain-extended with dimethylolcyclohexane and blended with a phenolic resol and a vinyl terpolymer in MEK was used to bond three different vinyl films A, B and C to steel panels at bake temperatures of 300° F., 350° F. and 400° F. all for one minute. Flat and dimple delamination tests were run initially and after one hour in boiling water. The results were tabulated as estimated percent vinyl remaining on the panels after testing. The vinyl stocks used were particularly difficult films to bond.

| | Delamination Tests | | | |
| | Initial | | Boiling Water | |
| | Flat | Dimple | Flat | Dimple |
| --- | --- | --- | --- | --- |
| 300° F. | | | | |
| Vinyl A | 90 | 100 | 50 | 10 |
| B | 100 | 20 | 60 | 30 |
| C | 80 | 20 | 0 | 0 |
| 350° F. | | | | |
| Vinyl A | 90 | 100 | 50 | 10 |
| B | 100 | 20 | 60 | 30 |
| C | 80 | 20 | 0 | 0 |
| 400° F. | | | | |
| Vinyl A | 100 | 100 | 100 | 80 |
| B | 100 | 80 | 60 | 40 |
| C | 100 | 60 | 0 | 0 |

TABLE I

Comparison Of Environmental Resistance Of Various Adhesive Bonds

| | Macroglycol | Short Chain Glycol | Phenolic | One Hour Boiling Water | |
| | | | | Flat | Dimple |
| --- | --- | --- | --- | --- | --- |
| 1. | Polycaprolactone | Dimethylolcyclohexane | I-resin | 20 | 5 |
| 2. | Polycaprolactone | Dimethylolcyclohexane | Resol[a] | 40 | 10 |
| 3. | Polycaprolactone | Dimethylolcyclohexane | Resol[b] | 45 | 20 |
| 4. | Polycaprolactone | 1,4-Butane diol | I-resin | 5 | 0 |
| 5. | Polycaprolactone | 1,4 Butane diol | Resol[a] | 25 | 20 |
| 6. | Polycaprolactone | 1,4 Butane diol | Resol[b] | 35 | 20 |
| 7. | Standard phthalate ester diol | Dimethylolcyclohexane | I-resin | 35 | 20 |
| 8. | Standard phthalate ester diol | Dimethylolcyclohexane | Resol[a] | 40 | 30 |
| 9. | Standard phthalate ester diol | Dimethylocyclohexane | Resol[b] | 35 | 20 |
| 10. | Standard phthalate ester diol | 1,4 Butane diol | I-resin | 45 | 40 |
| 11. | Standard phthalate ester diol | 1,4 Butane diol | Resol[a] | 45 | 35 |
| 12. | Standard phthalate | 1,4 Butane diol | Resol[b] | 45 | 65 |

TABLE I-continued
Comparison Of Environmental Resistance Of Various Adhesive Bonds

| | Macroglycol | Short Chain Glycol | Phenolic | One Hour Boiling Water Flat | Dimple |
|---|---|---|---|---|---|
| | ester diol | | | | |
| 13. | Terephthalate containing ester diol | Dimethylolcyclohexane | I-resin | 0 | 0 |
| 14. | Terephthalate containing ester diol | Dimethylolcyclohexane | Resol[a] | 85 | 40 |
| 15. | Terephthalate containing ester diol | Dimethylolcyclohexane | Resol[b] | 70 | 35 |
| 16. | Terephthalate containing ester diol | 1,4 Butane diol | I-resin | 10 | 5 |
| 17. | Terephthalate containing ester diol | 1,4 Butane diol | Resol[a] | 15 | 15 |
| 18. | Terephthalate containing ester diol | 1,4 Butane diol | Resol[b] | 0 | 0 |

[a] = Phenol-formaldehyde phenolic resol resin containing 36 weight percent methylol groups.
[b] = Trimethylolphenol phenolic resol resin containing 50 weight percent methylol groups.

The adhesive bond tests in the foregoing Table I were all obtained as described above in Example I baking for one minute at 300° F. The adhesive compositions 4, 5 and 6 are examples of commercial adhesives of the prior art.

It is apparent from the data in Table I that dimethylolcyclohexane is particularly advantageous as the chain extending agent when a terephthalate modified polyester glycol is employed in the adhesive. A comparison of phenolic-containing adhesives 17 and 14 shows that the substitution of dimethylolcyclohexane for 1,4-butane diol as the chain-extending agent increases the percent pass from 15 to 35 in the flat boiling water test and from 15 to 40% in the dimple test, thus illustrating the importance of the choice of short chain glycol extending agent. This affect is confirmed with the trimethylol phenol resol-containing adhesives 18 and 15 in which the substitution of dimethylolcyclohexane for 1,4-butane diol increases the percent pass from 0 to 70%.

It will also be seen from adhesives 1, 4, 7, 10, 13, and 16, that I-resin, a phenolic resol containing less than 15% methylol (about 8%) does not provide adhesives with as good environmental resistance as provided by the phenolic resols containing 36% and 50% methylol.

A comparison of adhesives 7, 8, 9, 10, 11, and 12 containing a phthalate ester diol with adhesives 1, 2, 3, 4, 5, and 6 based on a polycaprolactone, shows the superiority of the aromatic over the aliphatic polyesters.

Comparison of the standard phthalate ester diol adhesives 7, 8, 9, 10, 11, and 12 with the terephthalate-containing ester diol adhesives 13, 14, 15, 16, 17, and 18 shows that except in the case of the I-resin resol adhesives 7 and 13, the terephthalate modified materials were superior to the standard phthalate materials particularly when the preferred 36 and 50 weight percent methylol content resols were used with the preferred dimethylolcyclohexane-extended materials. It is apparent that the three factors mentioned above, i.e. high methylol-content phenolics, aromatic polycarboxylic acid and preferably terephthalic acid modified polyurethanes, and cycloaliphatic and preferably dimethylolcyclohexane chain-extension, all contribute to the environmental resistance of the vinyl to metal bonds. It is also apparent that the new adhesives are capable of forming satisfactory vinyl to metal bonds at about 150° C. (300° F.) which is 50° C. lower than the typical bonding cycle of adhesives of the prior art at temperatures of about 200° C. This makes the new compositions the only presently available adhesives providing satisfactory bonds for thin 6 mil and thinner vinyl films. The new adhesives also have the advantage of being single package adhesives and of providing bonds of enhanced environmental resistance, and particularly resistance to boiling water.

What is claimed is:

1. A heat-resistant, thermoplastic polyurethane substantially free of reactive isocyanate and hydroxyl groups comprising the reaction product of
   (a) at least one polyisocyanate having at least two reactive isocyanate groups;
   (b) at least one polyester polyol having at least two hydroxyl groups;
   (c) at least one cycloaliphatic diol chain-extending agent; and
   (d) at least one monofunctional isocyanate-reactive chain-terminating compound;

said polyisocyanate being present in an excess amount with respect to said polyester polyol and said cycloaliphatic, diol;
   said monofunctional isocyanate-reactive compound being present in an amount sufficient to ensure reaction of excess isocyanate groups;
   said polyester polyol having been prepared from the reaction of
   (i) at least one saturated acyclic, cyclic or aromatic monomeric or polymeric polyol having at least two hydroxyl groups;
   (ii) from 30 to 100 mole present terephthalic acid; and
   (iii) from 70 to 0 mole percent of at least one saturated or unsaturated acyclic, cyclic or aromatic carboxylic acid, other than terephthalic acid, having at least two carboxyl groups;
   said polyurethane having a molecular weight of at least 20,000.

2. A polyurethane according to claim 1 wherein said cycloaliphatic diol comprises dimethylolcyclohexane.

3. A polyurethane according to claim 1 wherein said polyester polyol is prepared from a polycarboxylic component comprising 30 mole percent terephtalic acid and 70 mole percent adipic acid.

4. A polyurethane according to claim 3 wherein said cycloaliphatic diol comprises dimethylolcyclohexane.

5. A polyurethane according to claim 1 wherein said polyester diol is prepared from 1,6-hexane diol, 50 mole percent terephthalic acid, 40 mole percent adipic acid and dimethylolcyclohexane, and said polyurethane has a molecular weight in the range from 60,000 to 300,000.

6. A polyurethane according to claim 5 wherein said polyisocyanate comprises a mixture of 2,4-toluene diisocyanate and 2,6-toluene diisocyanate.

7. A heat-resistant, thermoplastic polyurethane substantially free of reactive isocyanate and hydroxyl groups comprising the reaction product of
   (a) at least one aromatic polyisocyanate having at least two reactive isocyanate groups;
   (b) at least one polycaprolactone having at least two hydroxyl groups;
   (c) at least one cycloaliphatic diol chain-extending agent; and
   (d) at least one monofunctional isocyanate-reactive chain-terminating compound;

said polyisocyanate being present in an excess amount with respect to said polycaprolactone and said cycloaliphatic diol;

said monofunctional isocyanate-reactive compound being present in an amount sufficient to ensure reaction of excess isocyanate groups;

said polyurethane having a molecular weight of at least 20,000.

8. A polyurethane according to claim 7 wherein said cycloaliphatic diol comprises dimethylolcyclohexane.

9. A polyurethane according to claim 7 wherein said polyisocyanate comprises a mixture of 2,4-toluene diisocyanate and 2,6-toluene diisocyanate.

10. A polyurethane according to claim 9 wherein said cycloaliphatic diol comprises dimethylolcyclohexane and said polyurethane has a molecular weight in the range from 60,000 to 300,000.

* * * * *